US009978204B2

(12) United States Patent
Shimizu

(10) Patent No.: US 9,978,204 B2
(45) Date of Patent: May 22, 2018

(54) GAMING MACHINE

(71) Applicant: Konami Gaming, Incorporated, Las Vegas, NV (US)

(72) Inventor: Toshiaki Shimizu, Zama (JP)

(73) Assignee: KONAMI GAMING, INCORPORATED, Las Vegas, NV (US)

( * ) Notice: Subject to any disclaimer, the term of this patent is extended or adjusted under 35 U.S.C. 154(b) by 51 days.

(21) Appl. No.: 15/021,227

(22) PCT Filed: Sep. 12, 2014

(86) PCT No.: PCT/JP2014/074286
§ 371 (c)(1),
(2) Date: Mar. 10, 2016

(87) PCT Pub. No.: WO2015/037717
PCT Pub. Date: Mar. 19, 2015

(65) Prior Publication Data
US 2016/0225222 A1 Aug. 4, 2016

(30) Foreign Application Priority Data
Sep. 13, 2013 (JP) ................................ 2013-190972

(51) Int. Cl.
*A63F 9/24* (2006.01)
*A63F 13/00* (2014.01)
(Continued)

(52) U.S. Cl.
CPC ...... *G07F 17/3213* (2013.01); *G07F 17/3244* (2013.01); *G07F 17/34* (2013.01)

(58) Field of Classification Search
CPC ............................ G07F 17/3213; G07F 17/34
See application file for complete search history.

(56) References Cited

U.S. PATENT DOCUMENTS 5,251,898 A * 10/1993 Dickenson ............. G07F 17/34 273/143 R
6,413,162 B1 * 7/2002 Baerlocher ......... G07F 17/3202 273/143 R
(Continued)

FOREIGN PATENT DOCUMENTS

JP 2000-271266 A 10/2000
JP 2004-255135 A 9/2004
(Continued)

OTHER PUBLICATIONS

International Search Report dated Oct. 21, 2014 for International Application No. PCT/JP2014/074286.
(Continued)

*Primary Examiner* — Kevin Y Kim
(74) *Attorney, Agent, or Firm* — Howard & Howard Attorneys PLLC

(57) ABSTRACT

A gaming machine includes a controller and a spinnable reel having a plurality of symbols. The controller determines a symbol to be displayed when the reel stops and determines a spinning manner of the reel displaying the symbol when stopped based on the symbol. The controller spins the reel in the determined spinning manner and stops the reel so that the determined symbol is displayed.

16 Claims, 8 Drawing Sheets

(A)

| SPINNING SPEED DISTRIBUTION RATIO | | | | |
|---|---|---|---|---|
| | NORMAL SPINNING MANNER | SPINNING MANNER FOR RENDERING (SLOW) | SPINNING MANNER FOR RENDERING (FAST) | |
| PRIZE SYMBOL A | 60% | 20% | 20% | 100% |
| PRIZE SYMBOL B | 10% | 30% | 60% | 100% |
| END SYMBOL C | 10% | 50% | 40% | 100% |

(B)

| SPINNING DIRECTION DISTRIBUTION RATIO | | | |
|---|---|---|---|
| | NORMAL SPINNING MANNER (FORWARD) | SPINNING MANNER FOR RENDERING (REVERSE) | |
| PRIZE SYMBOL A | 90% | 10% | 100% |
| PRIZE SYMBOL B | 70% | 30% | 100% |
| END SYMBOL C | 70% | 30% | 100% |

(51) Int. Cl.

| | |
|---|---|
| ***G06F 17/00*** | (2006.01) |
| ***G06F 19/00*** | (2018.01) |
| ***G07F 17/32*** | (2006.01) |
| ***G07F 17/34*** | (2006.01) |

(56) References Cited

U.S. PATENT DOCUMENTS

| | | | | |
|---|---|---|---|---|
| 6,942,571 | B1 * | 9/2005 | McAllister | G07F 17/3209 463/20 |
| 2005/0070354 | A1 | 3/2005 | Baerlocher et al. | |
| 2007/0060323 | A1 * | 3/2007 | Isaac | G07F 17/3202 463/29 |

FOREIGN PATENT DOCUMENTS

| | | | |
|---|---|---|---|
| JP | 2005-237898 | A | 9/2005 |
| JP | 2012100707 | A | 5/2012 |
| JP | 2013-153875 | A | 8/2013 |

OTHER PUBLICATIONS

International Preliminary Report on Patentability dated Mar. 24, 2016.

International Search Report (PCT/JP2014/074286); dated Oct. 21, 2014.

* cited by examiner

Fig.7

(A)

| SPINNING SPEED DISTRIBUTION RATIO | | | | |
|---|---|---|---|---|
| | NORMAL SPINNING MANNER | SPINNING MANNER FOR RENDERING (SLOW) | SPINNING MANNER FOR RENDERING (FAST) | |
| PRIZE SYMBOL A | 60% | 20% | 20% | 100% |
| PRIZE SYMBOL B | 10% | 30% | 60% | 100% |
| END SYMBOL C | 10% | 50% | 40% | 100% |

(B)

| SPINNING DIRECTION DISTRIBUTION RATIO | | | |
|---|---|---|---|
| | NORMAL SPINNING MANNER (FORWARD) | SPINNING MANNER FOR RENDERING (REVERSE) | |
| PRIZE SYMBOL A | 90% | 10% | 100% |
| PRIZE SYMBOL B | 70% | 30% | 100% |
| END SYMBOL C | 70% | 30% | 100% |

*Fig.8*

| STOPPING ORDER | REEL (1) | REEL (2) | REEL (3) | REEL (4) | REEL (4) | ACCUMULATED POINTS |
|---|---|---|---|---|---|---|
| 1 | SPIN | SPIN | SPIN | PRIZE SYMBOL B | SPIN | 3 |
| 2 | SPIN | PRIZE SYMBOL B | SPIN | SPIN | SPIN | 6 |
| 3 | SPIN | SPIN | SPIN | SPIN | END SYMBOL C | 6 |
| 4 | SPIN | SPIN | PRIZE SYMBOL A | SPIN | END SYMBOL C | 7 |
| • | • | • | • | • | • | • |
| • | • | • | • | • | • | • |
| Y-1 | END SYMBOL C | PRIZE SYMBOL B | END SYMBOL C | END SYMBOL C | END SYMBOL C | 800 |
| Y | END SYMBOL C | END SYMBOL C | END SYMBOL C | END SYMBOL C | END SYMBOL C | 800 |

GAMING MACHINE

CROSS-REFERENCE TO RELATED APPLICATION(S)

This application is the National Stage of International Patent Application No. PCT/JP2014/074286, filed Sep. 12, 2014, which claims priority to Japanese Patent Application No. 2013-190972, filed Sep. 13, 2013, both disclosures of which are hereby incorporated by reference in their entirety.

TECHNICAL FIELD

The present invention relates to a gaming machine.

BACKGROUND ART

Patent Literature 1 describes a gaming machine for increasing a player's expectation for the progress of a game by means of a reel action. This gaming machine determines a symbol to be stop displayed on each reel and spins two reels in opposite directions. The gaming machine stop displays a wild symbol on one reel, thereby triggering the spin of the other reel to slow down.

CITATION LIST

Patent Literature

Patent Literature 1: Japanese Unexamined Patent Application Publication No. JP 2012-100707

SUMMARY OF INVENTION

Technical Problem

The gaming machine of Patent Literature 1, however, controls the movement of one reel in response to a stop symbol of the other reel. This requires that a predetermined symbol of the other reel be stopped first. Thus, the reel action of Patent Literature 1 may not be applied depending on the content of the game. In addition, rendering of the reel action may become confusing to the player when the number of reels is increased. There is a demand in the technical field for a gaming machine that incorporates rendering of a reel action that is widely applicable regardless of the content of the game, and that provides rendering of the reel action in a straightforward manner even when the number of reels is increased.

Solution to Problem

A gaming machine according to one aspect of the present invention includes a controller and a spinnable reel having a plurality of symbols. The controller is configured to determine a symbol to be displayed when the reel stops and to determine a spinning manner of the reel displaying the symbol when stopped based on the symbol. The controller is configured to then spin the reel in the determined spinning manner and to stop the reel so that the determined symbol is displayed.

According to this gaming machine, the spinning manner of the reel is determined based on the symbol that is to be displayed on the reel when the reel stops. The spinning manner of the reel is determined based solely on the symbol to be displayed on the reel. Thus, the gaming machine can provide a reel action that is widely applicable regardless of the content of the game. In addition, a player is able to predict the stop symbol in a straightforward manner from the movement of the reel. Therefore, it is possible to appropriately increase the player's expectation for the progress of the game.

In one embodiment, the spinning manner may include at least one of a spinning time, a spinning direction, and a spinning speed. By using the spinning time, the spinning direction, the spinning speed, or a combination thereof, the gaming machine can achieve an effective rendering of reel actions.

In one embodiment, the controller may determine the spinning manner from either a predetermined spinning manner or a spinning manner for rendering differing from the predetermined spinning manner based on the determined symbol and a predetermined probability. In addition, in one embodiment, the controller may determine the spinning manners from any one of a predetermined spinning manner and a plurality of spinning manners for rendering based on the determined symbol and a predetermined probability. In this way, the gaming machine can control a degree of relationship between the movement of the reel and the stop symbol whereby the gaming machine can control accuracy of the player's prediction of the stop symbol. Thus, by not allowing a definite prediction while increasing the player's expectancy of the stop symbol in a predetermined range of accuracy, the gaming machine can provide a game course that increases the player's expectation and keeps the player absorbed in the game until the end.

In one embodiment, the gaming machine may include a plurality of reels, and the controller may determine a stopping order of each of the reels and the symbol to be displayed when each of the reels stops based on a predetermined probability. Configured in this way, the spinning manner of each reel is determined based on the symbol to be displayed on each reel when it stops without being influenced by the symbols of the other reels. Thus, rendering of movements of the plurality of reels can be provided to the player in a straightforward manner.

A gaming machine according to another aspect of the invention includes a display unit configured to display a plurality of reels, each of the reels having arranged symbols, and a controller coupled to the display unit and configured to award a payout for a combination of symbols formed on the display unit by spinning and stopping the reels, wherein when the formed combination of symbols satisfies a predetermined condition, the controller provides a bonus game that repeats a process of awarding the payout in response to the symbols displayed on the display unit by spinning and stopping at least one of the plurality of reels, and wherein the controller during the bonus game determines the symbol to be displayed on the display unit and spins at least one of the plurality of reels in a spinning manner in response to the determined symbol.

According to this gaming machine, a bonus game is provided in which the spinning manner of the reel is determined based on the symbol to be displayed on the reel when the reel stops. Thus, the gaming machine can determine the spinning manner of the reel based solely on the symbol to be displayed on the reel allowing the player to predict the stop symbol in a straightforward manner from the movement of the reel. Thus, the gaming machine can provide a bonus game appropriately increasing the player's expectation for the progress of the game.

In one embodiment, the spinning manner may be configured to include at least one of a spinning time, a spinning direction, and a spinning speed. Additionally, in one embodiment, the controller during the bonus game may be configured to select the spinning manner from a plurality of spinning manners based on the determined symbol and a predetermined probability.

Advantageous Effects of Invention

A gaming machine is provided which incorporates rendering of a reel action that is widely applicable regardless of the content of the game, and which provides rendering of the reel action in a straightforward manner even when the number of reels is increased.

BRIEF DESCRIPTION OF DRAWINGS

FIG. 7 is a table illustrating determination of a spin rendering.

FIG. 8 is a table illustrating an example of a spin rendering.

DESCRIPTION OF EMBODIMENTS

Figure 1:
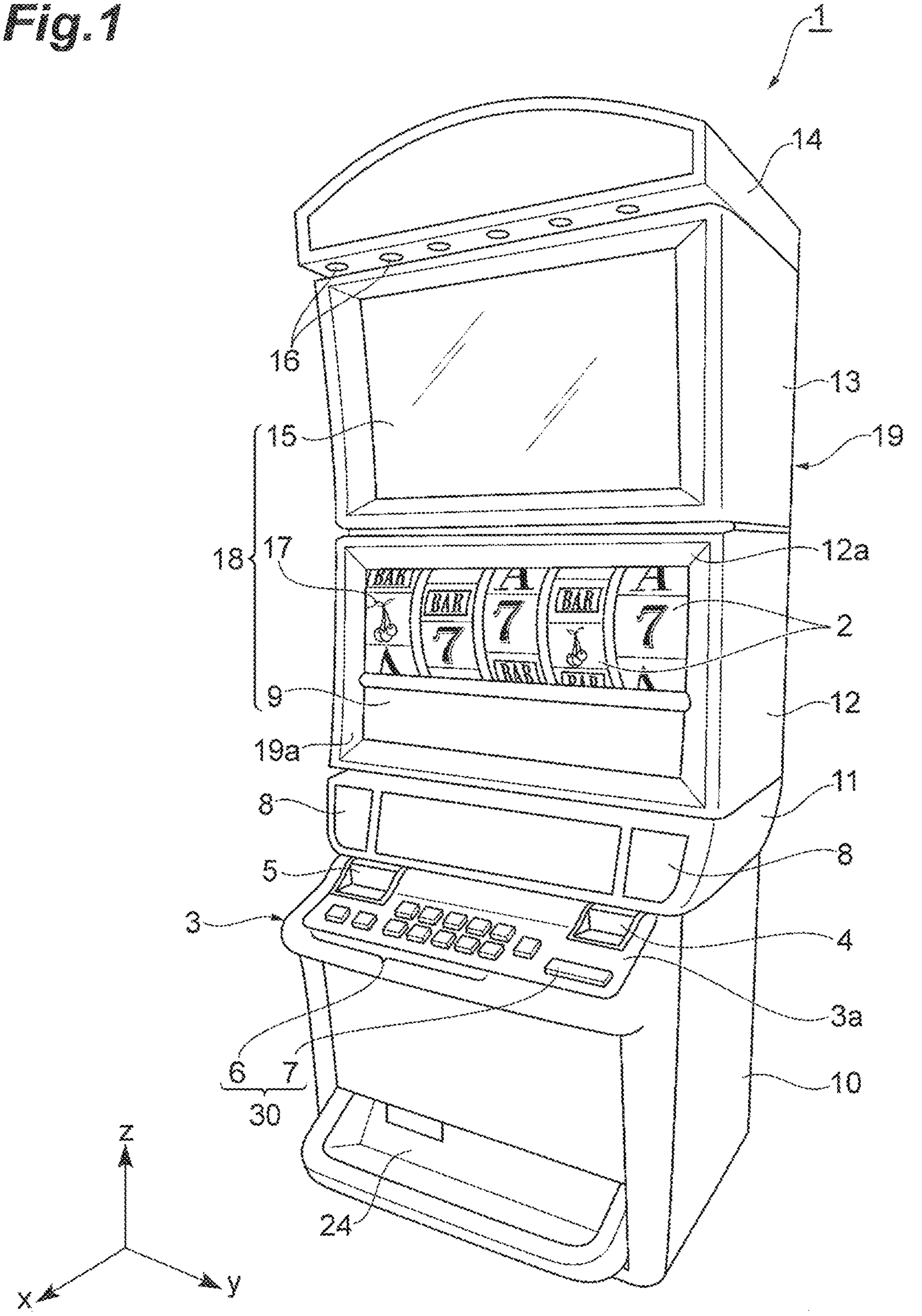
FIG. 1 is a perspective view of a gaming machine according to an embodiment.

Embodiments of the present invention will now be described with reference to the accompanying figures. It should be noted that identical reference signs are assigned to identical or equivalent elements in the drawings, and redundant descriptions thereof will be omitted.

A gaming machine 1 according to the embodiment may be employed as a machine providing a game in exchange for consumption of a game value, such as a slot machine, poker machine, keno machine, bingo machine, pachinko machine, or pachinko slot machine that provides a game to a player in a casino. A game value is a concept that includes tangible objects such as coin currency, paper currency, coins, medals, tickets, or electronic data having the same value as these objects. These game values may be used in a manner such that when deposited into the gaming machine 1 they are converted to and accumulated as a number of credits which is a consumption unit and a game is provided to a player through consumption of the accumulated credits. Below, for example, the gaming machine 1 is described as a slot machine that includes reels having a plurality of symbols and spins and stops the reels to determine whether or not there is a win in response to the symbols displayed when the reels are stopped.

FIG. 1 is a perspective view of the gaming machine 1 according to an embodiment. As shown in FIG. 1, the gaming machine 1 includes a vertical cabinet 19 that extends vertically in a Z direction. A display unit 18 is provided on a front face 19*a* of the cabinet 19. The display unit 18 is operable to display contents of a game. The display unit 18 can include at least one of a window for visibility of mechanical reels and a liquid crystal display device that displays virtual reels. Here, the display unit 18 has a window 17 for visibility of movements of mechanical reels 2, a lower display device 9 provided below the window 17, and an upper display device 15 provided above the window 17.

The cabinet 19 includes a reel box 12 housing a plurality of spinnable reels 2 therein. The reel box 12 houses a mechanism for rotationally driving each of the plurality of reels 2 independently. The window 17 described above is provided on a front face 12*a* of the reel box 12. The player can view the movements of the plurality of reels 2 and the symbols displayed on the plurality of reels 2 from outside the reel box 12 through the window 17. The lower display device 9 described above is provided on the front face 12*a* of the reel box 12. The lower display device 9 can display an image or video relating to the contents of the game.

An upper box 13 is provided above the reel box 12. The upper display device 15 described above is provided on a front face of the upper box 13. The upper display device 15 can display an image or a video relating to the contents of the game.

A control panel 3 is provided below the display unit 18. The control panel 3 is provided on a bottom cabinet 10 disposed on a lower side of the reel box 12. An insertion slot 4, an output slot 5, and an operational unit 30 are provided on a front face 3*a* of the control panel 3. A game value is deposited into the insertion slot 4 by a player as a counter value for executing a game. Coins or bills are used here as the game values as an example. The output slot 5 outputs a medium, for example, in response to operation of a payout button described below. Information on the accumulated credits in the gaming machine 1 is printed on the medium. The output slot 5 may be further configured to be able to read the credit information printed on the media and accumulate the information in the gaming machine 1.

The operational unit 30 accepts various types of player instructions for the gaming machine 1. The operational unit 30, for example, has a spin button 7 and a plurality of buttons 6. The spin button 7 accepts instructions to start a game (to start to spinning of the reels). The plurality of buttons 6 include, for example, a bet button group, a line specifying button group, a max bet button, or a payout button. The bet button group accepts operations of the player instructing the game value to be bet by a predetermined unit amount. The line specifying button group accepts operations that specify lines that are to be the subject of win determinations (hereinafter referred to as valid lines). The max bet button accepts operations instructing to bet the maximum game value that can be bet at one time. The payout button accepts operations instructing payout. A payout tray 24 for paying out the game value is provided below the control panel 3. The payout tray 24 is provided in the bottom cabinet 10. When the payout button is operated, the gaming machine 1 may either output the accumulated credit information from the output slot 5 or pay out the same from the payout tray 24 in the form of a game value, one of which will be selected by the setting of the gaming machine 1. The selection may also be made in response to the player's instruction.

A lower box 11 is disposed between the reel box 12 and the bottom cabinet 10. A plurality of speakers 8 are provided on a front face of the lower box 11. The plurality of speakers 8 may, for example, output sounds in response to the progress of the game. The plurality of speakers 8 may also output sounds when the gaming machine 1 is not providing a game.

An extended upper box 14 is disposed above the upper box 13. The extended upper box 14 is provided with a plurality of projection units 16.

Figure 2:
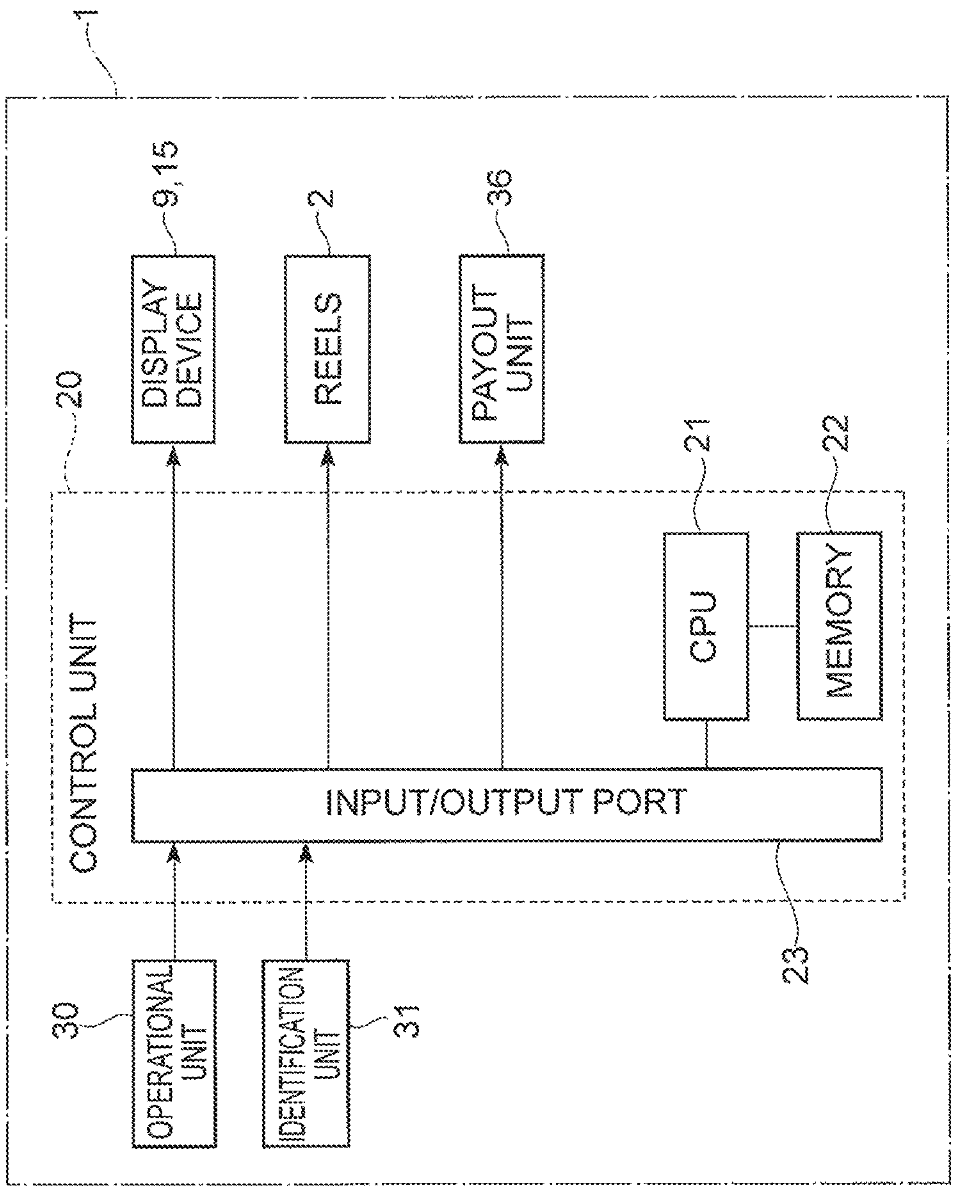
FIG. 2 is a block diagram illustrating a control system of the gaming machine shown in FIG. 1.

FIG. 2 shows a schematic of a control system of the gaming machine 1. The gaming machine 1 includes a control unit or controller 20. The controller 20 is constituted as a computer unit. The controller 20 includes a central processing unit (hereinafter CPU) 21, and a memory 22 that may be referenced by the CPU 21. The memory 22 can include a magnetic or optical storage medium, or a nonvolatile storage medium such as an EEPROM. The memory 22 stores a game program that is necessary to execute a game and game data to be referenced in the game program. The CPU 21 reads and executes a game program, thereby determining the contents of the game and allowing a slot game to proceed in a predetermined sequence. Here, the game contents refer to the contents that control each part of the gaming machine 1 in the course and results of the game, and are discussed below.

The operational unit 30 and an identification unit 31 are coupled to the CPU 21 via an input/output port 23. The operational unit 30 accepts the player's instructions and outputs a signal in response to the player's instructions to the CPU 21. The identification unit 31 identifies the game value (coins or bills) deposited from the insertion slot 4 and outputs a signal in response to the amount identified to the CPU 21.

The CPU 21 determines the contents of the game based on the player's instructions, the game value that is bet, etc. Further, the lower display device 9, the upper display device 15, the reels 2 and a payout unit 36 are coupled to the CPU 21 via the input/output port 23. In response to the determined contents of the game, the CPU 21 operates at least one of the lower display device 9, the upper display device 15, and the reels 2 to display the contents of the game in a display area. Here, the display area refers to a display panel portion of a display device when the display unit 18 is a display device, and to an area where the reels 2, etc. can be viewed through a window when the display unit 18 is a window. The CPU 21 controls spinning of the reels 2 in response to the determined contents of the game. The CPU 21 also controls the spinning manner of the reels 2. The spinning manner of the reels 2 includes the spinning time, spinning direction, spinning speed, or a combination thereof. The spinning time is the time from the start to the end of the spinning of the reel 2. The spinning direction is either a forward or reverse direction. The spinning speed is the number of rotations per unit time. The CPU 21 causes the payout unit 36 to manage payout of the game value to the payout tray 24, and the output slot 5 to manage printing of information on the accumulated number of credits on a medium and outputting the same. Other devices necessary to execute a slot game are also coupled to the controller 20 as appropriate but are not shown in the figure.

Figure 3:
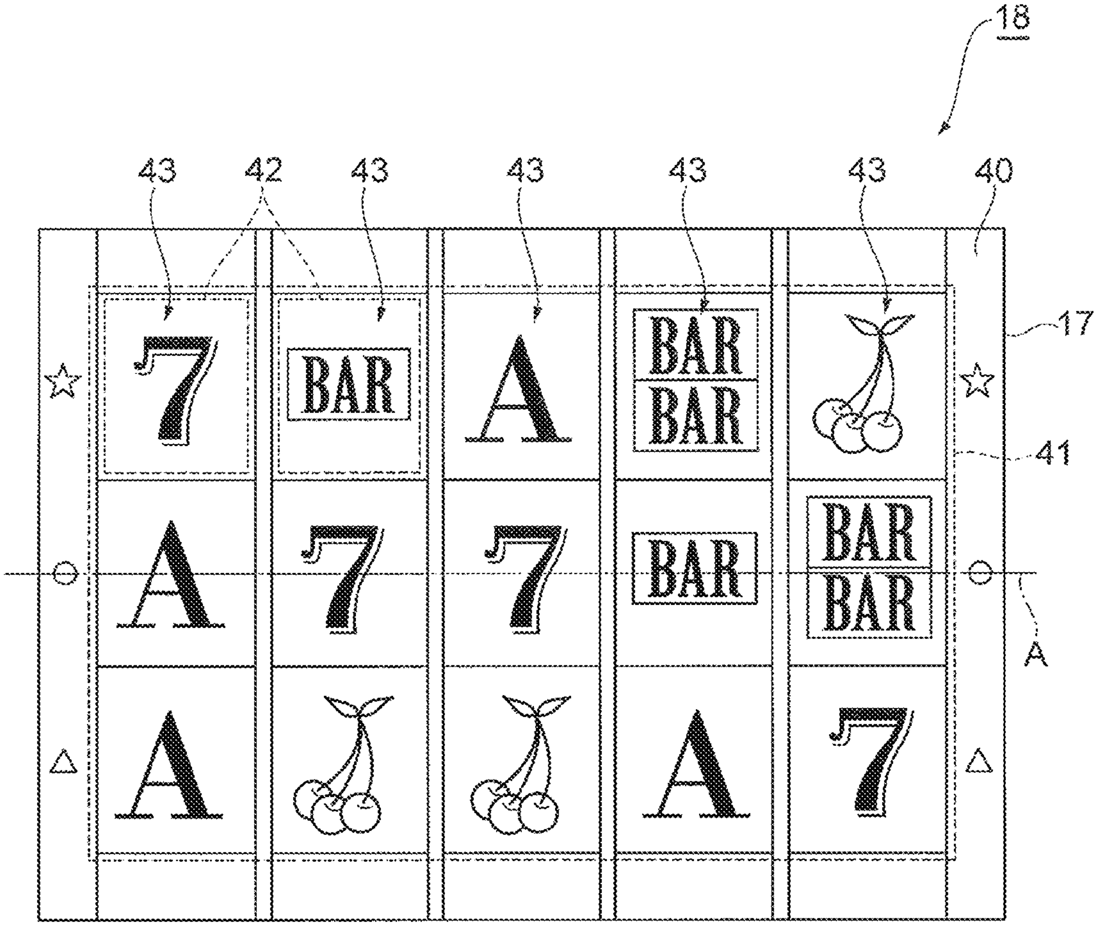
FIG. 3 is an example of a symbol area.

FIG. 3 is an example of a game screen which is displayed on the display unit 18 in accordance with the control of the CPU 21. As shown in FIG. 3, a game screen 40 is displayed inside the window 17 (display area). The game screen 40 is provided with a symbol area 41 for displaying the symbols of the reels 2. Here, the symbol area 41 is defined such that a plurality of cells 42 as symbol stop positions form a matrix having three horizontal rows and five vertical columns. Below, the transverse direction of the game screen 40 may be referred to as a row direction, and the longitudinal direction as a column direction. Borders of the cells 42 may be displayed on the display unit 18 in a manner such that they can be viewed visually by the player, or they may not be displayed. That is, the cells 42 may be logically or theoretically defined as the symbol stop positions inside the gaming machine 1, and the borders thereof do not necessarily need to be viewable.

In the symbol area 41, a symbol 43 is displayed for each cell 42. These symbols 43 are disposed on each of the plurality of reels 2. The reels 2 are arranged in a predetermined array, thereby displaying the symbols 43 arranged in rows and columns in a matrix in the symbol area 41. Various designs such as numbers, letters, or shapes may be employed as appropriate for the symbols 43.

A valid line is a line that specifies the plurality of cells 42 that are to be the subject of win determinations in a slot game and is set so as to extend across the plurality of reels 2. A player operates the line specifying button group in the operational unit 30 to set a valid line as appropriate. As one example, a horizontal line A connecting all the cells 42 that are positioned in the vertical center of the symbol area 41 may be set as the valid line. Other lines such as a line that extends diagonally across the symbol area 41 or a V-shaped or inverted V-shaped line in the symbol area 41 may also be set as the valid line. When the player operates the bet button group to specify the number of units to bet in one slot game and selects a valid line by the line specifying button group, these selections are recognized by the CPU 21. The player then operates the spin button 7 and the CPU 21 causes each of the symbols 43 to move (scroll) in the column direction in the symbol area 41 and the symbols 43 to stop scrolling at a predetermined stop time such that one symbol 43 appears in one cell 42. When the symbols 43 stop and the design of the symbols 43 that are displayed on the cells 42 on the valid line are the same or form a predetermined relationship, a winning pattern is formed. When the reels 2 are mechanically configured, the symbols 43 are arranged on the surface of each of the reels 2 and are scrolled by spinning the reels 2 and stopped by stopping the reels 2. In contrast, when the reels 2 are virtually-configured video reels, the symbols 43 are predetermined in the form of a virtual reel strip, which is a symbol alignment that is virtually configured corresponding to each reel 2, and recorded in the memory 22 as a part of the game data. The CPU 21 refers to the data recorded in the memory 22 and controls display of the reels 2 on the game screen 40 by scrolling and stopping the virtual reel strip.

Figure 4:
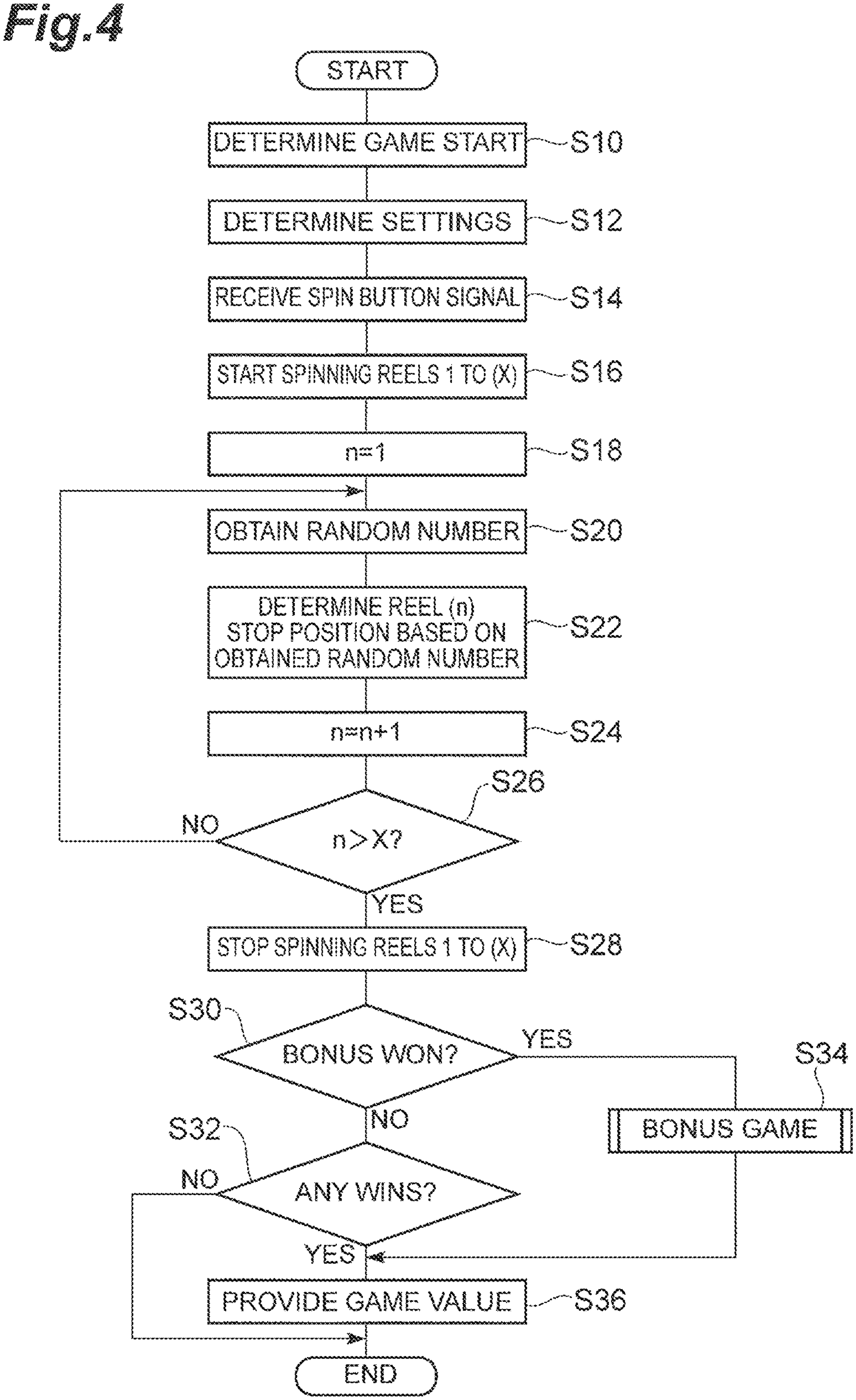
FIG. 4 is a flowchart illustrating operation of the gaming machine shown in FIG. 1.

FIG. 4 is a flowchart showing a routine that is executed by the CPU 21 at an appropriate frequency to control display of the reels 2 during execution of a slot game.

When the routine of FIG. 4 is initiated, the CPU 21 determines to start a game (S10). After a game value is deposited into the insertion slot 4 as a counter value for executing the game, the identification unit 31 outputs a signal to the CPU 21. The CPU 21 determines to start the game based on the signal of the identification unit 31. If game start is not instructed, determination is repeated and when game start is instructed, processing proceeds to S12.

In the process of S12, the CPU 21 determines the settings of the game. The operational unit 30 (the plurality of buttons 6) accepts the player's instructions and outputs a signal in response to the player's instructions to the CPU 21. The CPU 21 determines the game's settings based on the signals of the operational unit 30. If the game's settings are not instructed, determination is repeated and when the game's settings are instructed, the game's settings are determined and processing proceeds to S14.

In the process of S14, the CPU 21 receives the signal of the spin button 7. If the signal of the spin button 7 is not input, determination is repeated and when the signal of the spin button 7 is input, processing proceeds to S16.

In the process of S16, the CPU 21 causes the plurality of reels 2 to spin. Below, the Xth reel from the left is described as the reel (X). When all the reels are spun by the CPU 21, processing proceeds to S18. In the process of S18, the CPU 21 sets n=1 as an initial processing. After the setting, processing proceeds to S20.

In the process of S20, the CPU 21 obtains a random number. Once the random number is obtained, processing proceeds to S22. In the process of S22, the CPU 21 determines a stop position of the reel (n) based on the random number obtained in the process of S20. When this is determined, processing proceeds to S24. In the process of S24, the CPU 21 sets n=n+1. Once this is set, processing proceeds to S26. In the process of S26, the CPU 21 determines whether n>X is satisfied or not. If n>X is not satisfied, processing proceeds to S20 and the processes of S20 to S26 are repeatedly executed until n>X is satisfied. In this way, the stop positions of the reel (1) to reel (X) are determined. When n>X is satisfied, it means that the stop positions of all the reels are determined, and thus processing proceeds to S28.

In the process of S28, the CPU 21 stops each reel (X) based on the stop positions of each reel (X) determined in the process of S22. After each reel (X) is stopped, processing proceeds to S30. In the process of S30, the CPU 21 determines whether or not the combination of the symbols 43 that appear on the cells 42 in the symbol area 41 forms a predetermined bonus pattern. If no bonus pattern is formed, processing proceeds to S32.

In the process of S32, the CPU 21 determines whether or not the combination of the symbols 43 that appear on the cells 42 in the symbol area 41 forms a predetermined winning pattern. If no winning pattern is formed, the control process shown in FIG. 4 is completed. On the other hand, when a winning pattern is formed, processing proceeds to S36. In the process of S36, a prize amount that corresponds to the formed winning pattern is calculated and the game value equivalent to the calculated prize amount is provided to the player. The provided game value can be used to bet in subsequent slot games. When the player operates the payout button, either a prize equivalent to the game value that is currently accumulated is paid out from the payout unit 36 to the payout tray 24, or information on the accumulated number of credits is printed on a medium and output from the output slot 5. Thus, the control process shown in FIG. 4 is completed.

When a bonus pattern is formed in the process of S30, processing proceeds to S34. In the process of S34, the CPU 21 provides a bonus game. Below, a bonus game in which a game value is provided according to points obtained by the player is described as an example. The points are provided, for example, according to the symbols displayed on the horizontal line A in the symbol area 41 shown in FIG. 3. The symbols to be displayed include prize symbols (prize symbols A, B) for which points are provided, and an end symbol (end symbol C) for which no points are provided and for which movement of the reel 2 is stopped thereafter. First, all the reels 2 are spun and any one reel 2 is stopped. If the symbol that is displayed when the reel 2 is stopped is a prize symbol, points are provided. The stopped reel 2 is then spun again. On the other hand, if the symbol that is displayed when the reel 2 is stopped is an end symbol, the stopped reel 2 is not spun again. In other words, the reels 2 repeat spinning and stopping until the end symbol is displayed. If a total of the points obtained by the player before all the reels 2 display the end symbol and are stopped is the total points (accumulated points), the game value to be provided is determined according to the total points.

Figure 5:
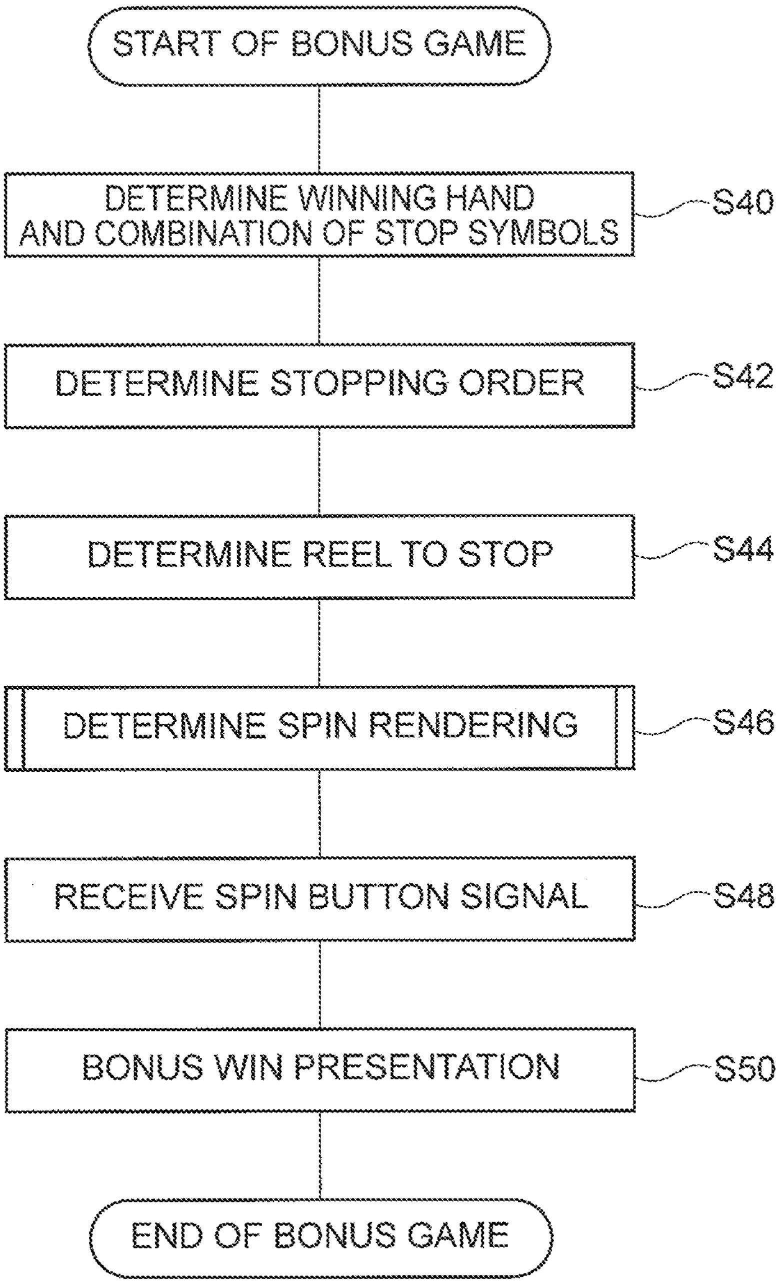
FIG. 5 is a flowchart illustrating operation of the gaming machine in a bonus game.

FIG. 5 is a flowchart showing a subroutine that is executed by the CPU 21 to control display of the reels 2. As shown in FIG. 5, the CPU 21 first determines a combination of a winning hand and stop symbols (S40). In this embodiment, there are 1st to 6th prizes in the winning hand, numbers 0 to 20 being assigned to the 1st to 6th prizes as winning ranges and stored in the memory 22. For example, 0 to 5 are 6th prize, 6 to 10 are 5th prize, 11 to 14 are 4th prize, 15 to 17 are 3rd prize, 18 and 19 are 2nd prize, and 20 is 1st prize. The CPU 21 obtains a random number and selects any one of 1st to 6th prizes based on the obtained random number and the winning range. Thus, the winning hand of the current bonus game is determined.

Each of the winning hands is stored in the memory 22 associated with a predetermined number of points. For example, the 1st prize is associated with 10000 points. In other words, if the player wins the 1st prize, at least 10000 points are earned in the bonus game. Similarly, the 2nd prize is associated with 5000 points, the 3rd prize with 2500 points, the 4th prize with 1200 points, the 5th prize with 600 points, and the 6th prize with 300 points. The CPU 21 obtains the points related to the current winning hand by referring to the memory 22. For example, for the 5th prize, the player earns at least 600 points and less than 1200 points. The CPU 21, for example, obtains a random number and determines a number of points in the range of at least 600 points and less than 1200 points based on the random number.

The CPU 21 determines a combination of stop symbols such that it matches the determined number of points. The CPU 21 determines the combination of prize symbols A, B such that it is within the range of the determined number of points. Here, in this embodiment as an example, when the prize symbol A stops it is worth 1 point and when the prize symbol B stops it is worth 3 points, the determined points being 800 points. In this case, the CPU 21 determines the combination of prize symbols A, B, such as whether to stop the prize symbol A 200 times and the prize symbol B 200 times or to stop the prize symbol A 500 times and the prize symbol B 100 times. After this is determined, processing proceeds to S42.

In the process of S42, the CPU 21 determines the order in which to display the combination of prize symbols A, B determined in the process of S40. The CPU 21 obtains a random number and determines the display order of the prize symbols A, B based on the random number. After this is determined, processing proceeds to S44.

In the process of S44, the CPU 21 determines the reel 2 to be stopped and to display each prize symbol based on the display order of the prize symbols A, B determined in the process of S42. For example, the CPU 21 obtains a random number and determines in which reel 2 the prize symbol A to be displayed first should be displayed based on the random number. Similarly, the CPU 21 obtains a random number and determines in which reel 2 the prize symbol B to be displayed second should be displayed based on the random number. In this way, the CPU 21 determines in which reel 2 the prize symbols to be displayed in a predetermined display order are to be displayed. The reels 2 that no longer need to display the prize symbols A, B during the bonus game, display the end symbol. From the processes above, the CPU 21 determines all the stopping orders of each of the reels 2 and all the symbols to be displayed when each of the reels 2 is stopped. After these are determined, processing proceeds to S46.

In the process of S46, the CPU 21 determines the movement of the reel 2 with which to stop the stop symbol. That is, the CPU 21 determines the rendering of the spinning manner (spin action rendering) of the reel 2. The CPU 21 determines the spinning manner of the reel 2 that displays the symbol when stopped based on the symbol. Below, a case where the combination of a spinning direction and a spinning speed is used is described as an example of the spinning manner of the reels 2.

Figure 6:
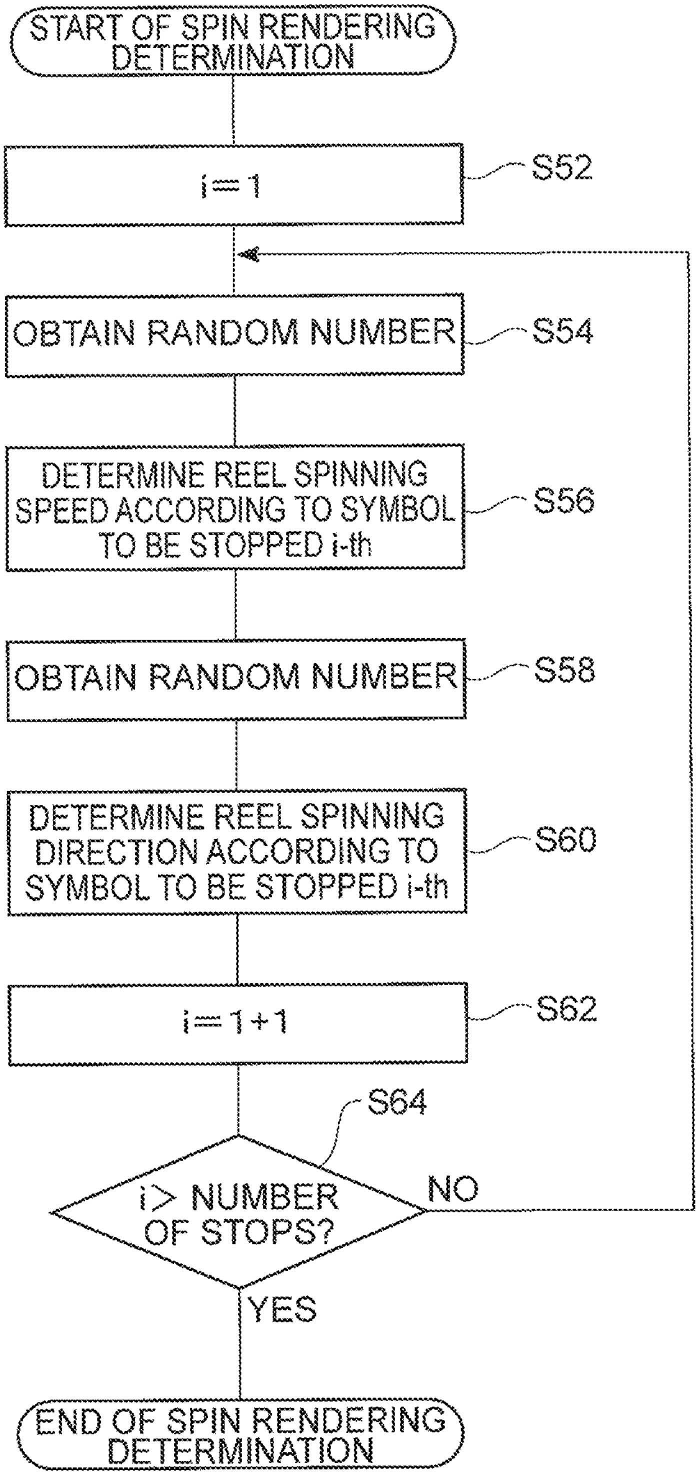
FIG. 6 is a flowchart illustrating operation of the gaming machine when determining a spin rendering.

FIG. 6 is a flowchart showing a subroutine that is executed by the CPU 21 to determine a spin rendering. As shown in FIG. 6, the CPU 21 uses a variable i, and sets variable i=1 (S52). The variable i is a natural number used to represent the stopping order. That is, the variable i is equal to or greater than 1 and is equal to or less than the number of stops of the reels 2 determined in the process of S44.

Next, the CPU 21 obtains a random number (S54). The CPU 21 then determines the spinning speed of the reel 2 that displays the symbol to be stopped i-th based on the symbol (S56).

The CPU 21, for example, makes settings such that the reel 2 moves at a spinning speed selected from a normal spinning speed (a predetermined spinning speed), a spinning speed for rendering that is slower than the normal spinning speed, and a spinning speed for rendering that is faster than the normal spinning speed, in response to the symbol to be displayed on the reel 2.

Specifically, the CPU 21 may adopt a spinning speed that is preset for each symbol. For example, in this embodiment, the prize symbol A is associated with a predetermined spinning speed, the prize symbol B with a spinning speed that is faster than the predetermined spinning speed, and the end symbol C with a spinning speed that is slower than the predetermined spinning speed. Using the relationships above, the CPU 21 determines the spinning speed of the reel 2 that displays the symbol to be stopped i-th. When the spinning speed of the reels 2 is determined in this manner, the process of S54 may be skipped.

Alternatively, the CPU 21 may use probabilities to change the relationship between each symbol and the spinning speed associated with the symbol. For example, the prize symbol A may spin at a predetermined spinning speed with a probability of 60%, and at a spinning speed that is different from the predetermined spinning speed (a fast spinning speed or slow spinning speed) with a probability of 40%. Similarly, for example, the prize symbol B may spin at a fast spinning speed with a probability of 60%, and at a spinning speed that is different from the fast spinning speed (a predetermined spinning speed or slow spinning speed) with a probability of 40%. Similarly, for example, the end symbol C may spin at a slow spinning speed with a probability of 50%, and at a spinning speed that is different from the slow spinning speed (a predetermined spinning speed or fast spinning speed) with a probability of 50%. FIG. 7(A) is a table showing an example of the distribution of the probabilities described above. The CPU 21 uses the table shown in FIG. 7(A) and a random number to determine the spinning speed of the reel 2 that displays the symbol to be stopped i-th.

Next, the CPU 21 obtains a random number (S58). The CPU 21 then determines the spinning direction of the reel 2 that displays the symbol to be stopped i-th based on the symbol (S60).

The CPU 21, for example, makes settings such that the reel 2 moves in either a normal spinning direction (forward rotation) or a spinning direction for rendering (reverse rotation) that is opposite the normal spinning direction, in response to the symbol to be displayed on the reel 2.

Specifically, the CPU 21 may adopt a spinning direction that is preset for each symbol. For example, in this embodiment, the prize symbol A is associated with forward rotation, the prize symbol B with forward rotation, and the end symbol C with reverse rotation. Using the above relationships, the CPU 21 determines the spinning direction of the reel 2 that displays the symbol to be stopped i-th. When the spinning direction of the reel 2 is determined in this manner, the process of S58 may be skipped.

Alternatively, the CPU 21 may use probabilities to change the spinning direction associated with the symbol. For example, the prize symbol A may spin in the forward direction with a probability of 90%, and in the reverse direction with a probability of 10%. Similarly, the prize symbol B and the end symbol C may spin in the forward direction with a probability of 70%, and in the reverse direction with a probability of 30%. FIG. 7(B) is a table showing an example of the distribution of the probabilities described above. The CPU 21 uses the table shown in FIG. 7 (B) and a random number to determine the spinning direction of the reel 2 that displays the symbol to be stopped i-th.

Once the spinning speed and the spinning direction of the reel 2 that displays the symbol to be stopped i-th are determined, the CPU 21 sets i=i+1 (S62). After setup, processing proceeds to S64. In the process of S64, the CPU 21 determines whether or not the variable i is greater than the number of stops (e.g., Y) of the reels 2. If the variable i is not greater than the number of stops of the reels 2, processing proceeds to S54. Thus, the processes of S54 to S64 are repeated until the variable i is greater than the number of stops of the reels 2. In this way, the spinning manner of the first to Y-th reels 2 is determined. When n>Y is satisfied, it means that the spin rendering of the reels 2 for all the stop symbols are determined, and the subroutine shown in FIG. 6 is completed.

When the subroutine shown in FIG. 6 is completed, processing proceeds to S48 in FIG. 5. In the process of S48, the CPU 21 receives the signal of the spin button 7. If the signal of the spin button 7 is not input, determination is repeated and when the signal of the spin button 7 is input, processing proceeds to S50. In the process of S50, the CPU 21 executes a bonus game based on the determined spin rendering. FIG. 8 is a table describing an example of the spin rendering. In FIG. 8, an example of the spin rendering when 800 points are to be earned (when 5th prize is won) is shown. FIG. 8 shows the manners of display of reels 1 to 5 and the accumulated points at stopping order i. As shown in FIG. 8, at stopping order 1, for example, all the reels spin and only reel (4) stops displaying the prize symbol B. Since 3 points are earned with the prize symbol B, the accumulated points are 3. Next, at stopping order 2, all the reels spin and only reel (2) stops displaying the prize symbol B. Since 3 points are earned with the prize symbol B, the accumulated points are 6. Next, at stopping order 3, all the reels spin and only reel (5) stops displaying the end symbol C. Since no points are earned with the end symbol C, the accumulated points are 6. After this, reel (5) is not spun. Next, at stopping order 4, all the reels except reel (5) spin and only reel (3) stops displaying the prize symbol A. Since 1 point is earned with the prize symbol A, the accumulated points are 7. Thus, the game display proceeds until the stopping order i is Y, when all the reels stop and the accumulated points are 800. When the process of S50 is completed, the subroutine shown in FIG. 5 is completed.

When the subroutine shown in FIG. 5 is completed, processing proceeds to S36 in FIG. 4. In the process of S36, the prize amount earned in the bonus game is calculated and the game value equivalent to the calculated prize amount is provided to the player. When the player operates the payout button, either a prize equivalent to the game value that is currently accumulated is paid out from the payout unit 36 to the payout tray 24, or information on the accumulated number of credits is printed on a medium and output from the output slot 5. Thus, the control process shown in FIG. 4 is completed.

As described above, in the gaming machine 1 according to the embodiment, the spinning manner of the reel 2 is determined based on the symbol to be displayed on the reel 2 when the reel 2 stops. The spinning manner of the reel 2 is determined based solely on the symbol to be displayed on the reel 2 without being influenced by the symbols of the other reels 2. Thus, it is not necessary for the stop symbols of the other reels to be determined in advance. Therefore, rendering of reel actions that is widely applicable regardless of the content of the game can be provided. Furthermore, as the player can predict the stop symbol from the movement of the reel 2, it is possible to appropriately increase the player's expectation for the progress of the game.

Additionally, in the gaming machine 1 according to the embodiment, the movement of the reels can be varied using the spinning time, spinning direction, spinning speed, or combinations thereof, which makes it possible to achieve effective rendering using reel actions.

Additionally, in the gaming machine 1 according to the embodiment, the degree of relationship between the movement of the reels 2 and the stop symbols can be controlled using the tables (A) and (B) of FIG. 7 which enables the accuracy of the player's prediction of the stop symbols to be controlled. Thus, by not allowing a definite prediction while increasing the player's expectancy of the stop symbols in a predetermined range of accuracy, a game development that increases the player's expectation and keeps players absorbed in the game until the end can be provided.

Further, in the gaming machine 1 according to the embodiment, a bonus game is provided which repeats a process of awarding a payout in response to the symbols displayed on the display unit 18 by spinning and stopping at least one reel 2 of the plurality of reels 2. Such a bonus game represents sequential wins by repeatedly stopping predetermined symbols and then awards the payout to the player, whereby it is possible to build up expectation for a higher payout by presenting the results of the bonus game to the player in stages compared to a bonus game in which the payout of the bonus game is provided as a result of only one game. Additionally, since the reels 2 spin in a manner according to the symbol to be stopped next, the player can predict the symbol that is going to stop next, and thus a bonus game which is capable of further increasing the player's expectation is provided.

The present invention may be embodied in other suitable forms without being limited to the embodiments described above. For example, the number of reels disposed in the symbol area is not limited to the examples of the above embodiments. In the above embodiments, all the reels are described as physical reels but a part or all of the reels may be virtual reels (video reels) that are displayed as an image on the screen of the display device. Additionally, although the above embodiments describe the spinning speed and spinning direction of the reels 2, the spinning time of the reels 2 can also be set in a similar manner to the spinning speed and spinning direction of the reels 2. For example, a normal spinning time and a spinning time for rendering may be provided for each symbol and set to be changed with predetermined probabilities. Additionally, although the above embodiments describe the normal spinning speed and spinning direction as the normal spinning manner (predetermined spinning manner), the normal spinning speed, spinning direction, and spinning time may also be set as the normal spinning manner (predetermined spinning manner). Further, the above embodiments describe a case where the spin rendering of the reels is carried out in the bonus game, but it may be used during a normal game.

The above embodiment describes, but is not limited to, obtaining a random number successively in each of the normal games and the bonus game to determine the game contents. The random numbers that are required at the start of each game may be obtained in advance and saved in the memory 22 to be read from the memory 22 and used as necessary.

The invention claimed is:

1. A gaming machine, comprising:

a spinnable reel having a plurality of symbols; and a memory device including a spinning manner distribution table including a plurality of spinning manners associated with the plurality of symbols, each symbol of the plurality of symbols including a corresponding selection probability associated with each of the spinning manners;

a controller configured to:

determine a symbol to be displayed when the reel stops;

access the spinning manner distribution table and determine the selection probabilities of each spinning manner associated with the determined symbol;

randomly determine a spinning manner of the reel based on the determined symbol and the determined selection probabilities of each spinning manner associated with the determined symbol; and spin the reel in the determined spinning manner and stop the reel so that the determined symbol is displayed.

2. A gaming machine according to claim 1, wherein the spinning manner includes at least one of a spinning time, a spinning direction, and a spinning speed.

3. A gaming machine according to claim 1, wherein the controller determines the spinning manner from either a predetermined spinning manner or a spinning manner for rendering differing from the predetermined spinning manner based on the determined symbol and a predetermined probability.

4. A gaming machine according to claim 1, wherein each of the selection probabilities of each spinning manner associated with the determined symbol is different.

5. A gaming machine according to claim 1, further comprising a plurality of the reels, wherein the controller determines a stopping order of each of the reels and the symbol to be displayed when each of the reels stops based on a predetermined probability.

6. A gaming machine comprising:

a display unit configured to display a plurality of reels, each of the reels having arranged symbols;

a memory device including a spinning manner distribution table including a plurality of spinning manners associated with the plurality of symbols, each symbol of the plurality of symbols including a corresponding selection probability associated with each of the spinning manners; and a controller coupled to the display unit and the memory device, and configured to award a payout for a combination of symbols formed on the display unit by spinning and stopping the reels, wherein when the formed combination of symbols satisfies a predetermined condition, the controller provides a bonus game that repeats a process of awarding the payout in response to the symbols displayed on the display unit by spinning and stopping at least one of the plurality of reels, and wherein the controller during the bonus game determines the symbol to be displayed when the at least one of the plurality of reels stops, accesses the spinning manner distribution table and determines the selection probabilities of each spinning manner associated with the determined symbol, randomly determines a spinning manner of the at least one of the plurality of reels based on the determined selection probabilities of each spinning manner associated with the determined symbol, and spins at least one of the plurality of reels in the determined spinning manner.

7. A gaming machine according to claim 6, wherein the spinning manner includes at least one of a spinning time, a spinning direction, and a spinning speed.

8. A gaming machine according to claim 6, wherein the plurality of spinning manners includes a normal spinning manner and a reverse spinning manner, the normal spinning manner having a different selection probability that the reverse spinning manner.

9. A gaming machine according to claim 2, wherein the controller determines the spinning manner from either a predetermined spinning manner or a spinning manner for rendering differing from the predetermined spinning manner based on the determined symbol and a predetermined probability.

10. A gaming machine according to claim 9, wherein each of the selection probabilities of each spinning manner associated with the determined symbol is different.

11. A gaming machine according to claim 2, further comprising a plurality of the reels, wherein the controller determines a stopping order of each of the reels and the symbol to be displayed when each of the reels stops based on a predetermined probability.

12. A gaming machine according to claim 3, further comprising a plurality of the reels, wherein the controller determines a stopping order of each of the reels and the symbol to be displayed when each of the reels stops based on a predetermined probability.

13. A gaming machine according to claim 4, further comprising a plurality of the reels, wherein the controller determines a stopping order of each of the reels and the symbol to be displayed when each of the reels stops based on a predetermined probability.

14. A gaming machine according to claim 9, further comprising a plurality of the reels, wherein the controller determines a stopping order of each of the reels and the symbol to be displayed when each of the reels stops based on a predetermined probability.

15. A gaming machine according to claim 10, further comprising a plurality of the reels, wherein the controller determines a stopping order of each of the reels and the symbol to be displayed when each of the reels stops based on a predetermined probability.

16. A gaming machine according to claim 7, wherein the controller displays the bonus game using the plurality of reels, the controller is configured to execute the bonus game including:

randomly determine a bonus award provided during the bonus game;

determine a number of prize symbols to be displayed during the bonus game and determine a number of symbol display events based on the number of prize symbols, each symbol display event including one of the plurality of reels being stopped to display a corresponding prize symbol;

for each symbol display event:

determine a prize symbol displayed during the corresponding symbol display event;

select a reel of the plurality of reels to display the determined prize symbol; and select the spinning manner from a plurality of spinning manners for spinning the selected reel based on the determined prize symbol and the determined selection probabilities of each spinning manner associated with the determined prize symbol; and sequentially display each of the determined number of symbol display events to display the bonus game.

* * * * *